US009208101B2

(12) United States Patent
Smith, Jr.

(10) Patent No.: US 9,208,101 B2
(45) Date of Patent: Dec. 8, 2015

(54) VIRTUAL NAND CAPACITY EXTENSION IN A HYBRID DRIVE

(71) Applicant: Western Digital Technologies, Inc., Irvine, CA (US)

(72) Inventor: Steven C. Smith, Jr., Huntington Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 240 days.

(21) Appl. No.: 13/928,318

(22) Filed: Jun. 26, 2013

(65) Prior Publication Data

US 2015/0006823 A1 Jan. 1, 2015

(51) Int. Cl.
*G06F 12/08* (2006.01)

(52) U.S. Cl.
CPC .................................. *G06F 12/0891* (2013.01)

(58) Field of Classification Search
CPC .................................................. G06F 12/0891
See application file for complete search history.

(56) References Cited

U.S. PATENT DOCUMENTS

| 5,414,861 A | 5/1995 | Horning |
| 5,519,831 A | 5/1996 | Holzhammer |
| 5,581,785 A | 12/1996 | Nakamura et al. |
| 5,636,355 A | 6/1997 | Ramakrishnan et al. |
| 5,778,418 A | 7/1998 | Auclair et al. |
| 5,966,726 A | 10/1999 | Sokolov |
| 5,978,922 A | 11/1999 | Arai et al. |
| 6,018,789 A | 1/2000 | Sokolov et al. |
| 6,101,574 A | 8/2000 | Kumasawa et al. |
| 6,434,696 B1 | 8/2002 | Kang |
| 6,449,683 B1 | 9/2002 | Silvester |
| 6,539,456 B2 | 3/2003 | Stewart |
| 6,795,894 B1 | 9/2004 | Neufeld et al. |
| 6,798,599 B2 | 9/2004 | Dykes et al. |
| 6,856,556 B1 | 2/2005 | Hajeck |
| 6,968,450 B1 | 11/2005 | Rothberg et al. |
| 7,107,444 B2 | 9/2006 | Fortin et al. |
| 7,126,857 B2 | 10/2006 | Hajeck |
| 7,170,706 B2 | 1/2007 | Stence et al. |
| 7,318,118 B2 | 1/2008 | Chu et al. |

(Continued)

FOREIGN PATENT DOCUMENTS

| WO | 2011071818 A2 | 6/2011 |
| WO | 2013055312 A1 | 4/2013 |

OTHER PUBLICATIONS

International Search Report and Written Opinion dated Oct. 15, 2014 from related PCT Serial No. PCT/US2014/043647, 9 pages.

*Primary Examiner* — Yong Choe (57) ABSTRACT

A method and system for virtual cache memory extension in a data storage device are disclosed herein. The storage device may include a memory that serves as a cache to a primary memory. The method for the storage device may include maintaining mapping information of one or more logical block addresses associated with data stored in the cache memory and maintaining mapping information of one or more logical block addresses associated with data not stored in the cache memory. Data stored in the cache memory may be selected for eviction when the available capacity of the cache memory changes, e.g., due to storing resume data in a hibernate operation. Data selected for eviction may be transferred to the primary memory but still tracked as being part of a virtual extended cache, and thus can be quickly restored into the cache memory when the resume data is no longer needed.

20 Claims, 6 Drawing Sheets

(56) References Cited

U.S. PATENT DOCUMENTS

| | | | |
|---|---|---|---|
| 7,330,938 | B2 | 2/2008 | Nenov et al. |
| 7,340,593 | B2 | 3/2008 | Martin |
| 7,430,136 | B2 | 9/2008 | Merry, Jr. et al. |
| 7,447,807 | B1 | 11/2008 | Merry et al. |
| 7,461,202 | B2 | 12/2008 | Forrer, Jr. et al. |
| 7,502,256 | B2 | 3/2009 | Merry, Jr. et al. |
| 7,509,441 | B1 | 3/2009 | Merry et al. |
| 7,568,068 | B2 | 7/2009 | Kulkarni et al. |
| 7,596,643 | B2 | 9/2009 | Merry, Jr. et al. |
| 7,634,585 | B2 | 12/2009 | Conley et al. |
| 7,653,778 | B2 | 1/2010 | Merry, Jr. et al. |
| 7,685,337 | B2 | 3/2010 | Merry, Jr. et al. |
| 7,685,338 | B2 | 3/2010 | Merry, Jr. et al. |
| 7,685,374 | B2 | 3/2010 | Diggs et al. |
| 7,733,712 | B1 | 6/2010 | Walston et al. |
| 7,765,373 | B1 | 7/2010 | Merry et al. |
| 7,898,855 | B2 | 3/2011 | Merry, Jr. et al. |
| 7,912,991 | B1 | 3/2011 | Merry et al. |
| 7,936,603 | B2 | 5/2011 | Merry, Jr. et al. |
| 7,962,792 | B2 | 6/2011 | Diggs et al. |
| 8,078,918 | B2 | 12/2011 | Diggs et al. |
| 8,082,433 | B1 | 12/2011 | Fallone et al. |
| 8,090,899 | B1 | 1/2012 | Syu |
| 8,095,851 | B2 | 1/2012 | Diggs et al. |
| 8,108,692 | B1 | 1/2012 | Merry et al. |
| 8,122,185 | B2 | 2/2012 | Merry, Jr. et al. |
| 8,127,048 | B1 | 2/2012 | Merry et al. |
| 8,135,903 | B1 | 3/2012 | Kan |
| 8,151,020 | B2 | 4/2012 | Merry, Jr. et al. |
| 8,161,227 | B1 | 4/2012 | Diggs et al. |
| 8,166,245 | B2 | 4/2012 | Diggs et al. |
| 8,243,525 | B1 | 8/2012 | Kan |
| 8,254,172 | B1 | 8/2012 | Kan |
| 8,261,012 | B2 | 9/2012 | Kan |
| 8,296,625 | B2 | 10/2012 | Diggs et al. |
| 8,312,207 | B2 | 11/2012 | Merry, Jr. et al. |
| 8,316,176 | B1 | 11/2012 | Phan et al. |
| 8,341,339 | B1 | 12/2012 | Boyle et al. |
| 8,375,151 | B1 | 2/2013 | Kan |
| 8,392,635 | B2 | 3/2013 | Booth et al. |
| 8,397,107 | B1 | 3/2013 | Syu et al. |
| 8,407,449 | B1 | 3/2013 | Colon et al. |
| 8,423,722 | B1 | 4/2013 | Deforest et al. |
| 8,433,858 | B1 | 4/2013 | Diggs et al. |
| 8,443,167 | B1 | 5/2013 | Fallone et al. |
| 8,447,920 | B1 | 5/2013 | Syu |
| 8,458,435 | B1 | 6/2013 | Rainey, III et al. |
| 8,478,930 | B1 | 7/2013 | Syu |
| 8,489,854 | B1 | 7/2013 | Colon et al. |
| 8,503,237 | B1 | 8/2013 | Horn |
| 8,521,972 | B1 | 8/2013 | Boyle et al. |
| 8,549,236 | B2 | 10/2013 | Diggs et al. |
| 8,583,835 | B1 | 11/2013 | Kan |
| 8,601,311 | B2 | 12/2013 | Horn |
| 8,601,313 | B1 | 12/2013 | Horn |
| 8,612,669 | B1 | 12/2013 | Syu et al. |
| 8,612,804 | B1 | 12/2013 | Kang et al. |
| 8,615,681 | B2 | 12/2013 | Horn |
| 8,638,602 | B1 | 1/2014 | Horn |
| 8,639,872 | B1 | 1/2014 | Boyle et al. |
| 8,683,113 | B2 | 3/2014 | Abasto et al. |
| 8,700,834 | B2 | 4/2014 | Horn et al. |
| 8,700,950 | B1 | 4/2014 | Syu |
| 8,700,951 | B1 | 4/2014 | Call et al. |
| 8,706,985 | B1 | 4/2014 | Boyle et al. |
| 8,707,104 | B1 | 4/2014 | Jean |
| 8,713,066 | B1 | 4/2014 | Lo et al. |
| 8,713,357 | B1 | 4/2014 | Jean et al. |
| 8,719,531 | B2 | 5/2014 | Strange et al. |
| 8,724,422 | B1 | 5/2014 | Agness et al. |
| 8,725,931 | B1 | 5/2014 | Kang |
| 8,745,277 | B2 | 6/2014 | Kan |
| 8,751,728 | B1 | 6/2014 | Syu et al. |
| 8,769,190 | B1 | 7/2014 | Syu et al. |
| 8,769,232 | B2 | 7/2014 | Suryabudi et al. |
| 8,775,720 | B1 | 7/2014 | Meyer et al. |
| 8,782,327 | B1 | 7/2014 | Kang et al. |
| 8,788,778 | B1 | 7/2014 | Boyle |
| 8,788,779 | B1 | 7/2014 | Horn |
| 8,788,880 | B1 | 7/2014 | Gosla et al. |
| 8,793,429 | B1 | 7/2014 | Call et al. |
| 2003/0142561 | A1 | 7/2003 | Mason, Jr. et al. |
| 2004/0088481 | A1 | 5/2004 | Garney |
| 2007/0005883 | A1 | 1/2007 | Trika |
| 2008/0024899 | A1 | 1/2008 | Chu et al. |
| 2008/0209198 | A1 | 8/2008 | Majni et al. |
| 2010/0174849 | A1 | 7/2010 | Walston et al. |
| 2010/0250793 | A1 | 9/2010 | Syu |
| 2010/0306288 | A1 | 12/2010 | Stein et al. |
| 2011/0099323 | A1 | 4/2011 | Syu |
| 2011/0246821 | A1 | 10/2011 | Eleftheriou et al. |
| 2011/0283049 | A1 | 11/2011 | Kang et al. |
| 2012/0260020 | A1 | 10/2012 | Suryabudi et al. |
| 2012/0278531 | A1 | 11/2012 | Horn |
| 2012/0284460 | A1 | 11/2012 | Guda |
| 2012/0324191 | A1 | 12/2012 | Strange et al. |
| 2013/0054872 | A1 | 2/2013 | Thomas, III et al. |
| 2013/0132638 | A1 | 5/2013 | Horn et al. |
| 2013/0145106 | A1 | 6/2013 | Kan |
| 2013/0290793 | A1 | 10/2013 | Booth et al. |
| 2014/0059405 | A1 | 2/2014 | Syu et al. |
| 2014/0101369 | A1 | 4/2014 | Tomlin et al. |
| 2014/0115427 | A1 | 4/2014 | Lu |
| 2014/0133220 | A1 | 5/2014 | Danilak et al. |
| 2014/0136753 | A1 | 5/2014 | Tomlin et al. |
| 2014/0149826 | A1 | 5/2014 | Lu et al. |
| 2014/0157078 | A1 | 6/2014 | Danilak et al. |
| 2014/0181432 | A1 | 6/2014 | Horn |
| 2014/0223255 | A1 | 8/2014 | Lu et al. |

VIRTUAL NAND CAPACITY EXTENSION IN A HYBRID DRIVE

BACKGROUND

1. Technical Field

This disclosure relates to computer systems including host systems and data storage systems or devices. More particularly, the disclosure relates to the management of data for hybrid data storage devices.

2. Description of the Related Art

Data storage devices are commonly used to record or store data thereon or to reproduce data from a recording media. Data storage devices can include different types of non-volatile memory for serving these purposes. One type of non-volatile memory includes a rotating magnetic disk. In addition to a magnetic disk, data storage devices can also include a second type of non-volatile memory, such as a solid state memory. Data storage devices that utilize both a magnetic disk and a solid state non-volatile memory are often referred to as hybrid drives.

When compared to traditional storage drives that include only one type of non-volatile memory, hybrid drives can provide improved performance characteristics. For example, hybrid drives can improve the response time when accessing certain data stored on the solid state memory while still maintaining affordability and other benefits due to the inclusion of the magnetic disk. Unfortunately, solid state memory has commonly cost more than other forms of non-volatile memory. Thus, the expense in having a storage drive comprised entirely of solid state memory may be too high for some consumers or applications. Hybrid drives utilize a mix of both traditional non-volatile memory and solid state memory to maintain a more affordable product to take advantage of other benefits of traditional non-volatile memory, such as improved endurance.

A particular example of the benefits provided by a hybrid drive can be shown during a hibernate process of a computer system. Before turning off or reducing power, a computer system may perform a hibernate process to preserve a state of the computer system in a non-volatile memory. When power is later restored to the computer system, an operating system of the computer system performs a resume process to restore the computer system to the same state as before hibernation. A solid state memory, such as flash memory, should be generally capable of a relatively quick resumption after hibernation due to its high read transfer rate.

BRIEF DESCRIPTION OF THE DRAWINGS

Systems and methods that embody the various features of the invention will now be described with reference to the following drawings, in which.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Storage systems, such as hybrid storage devices, that utilize more than one type of memory for the storage or access of electronic data must determine not only a block of available memory for the storage of the electronic data, but also which type of memory is to be used for the storage or access operation. In some cases, a connected host system may provide this determination via a signal to the storage system. In other cases, the determination may be made via logical evaluation by the storage system itself, either in conjunction with signals from a connected host system or entirely through internal determinations.

The determination of storage destination may be based on priority associated with the data. Data with a higher priority level may be given precedence in terms of memory type or storage location within the storage system. Hybrid storage devices that utilize a combination of more expensive memory types that provide improved operational performance (e.g., solid state memory such as NAND flash memory) with less costly memory types (e.g., magnetic storage), may seek to place prioritized data into the more expensive memory. However, as data in a storage system may frequently change in priority as a user performs different tasks, a data management system should function to appropriately transfer data within the storage system to increase or optimize performance.

In one embodiment, a hybrid drive may include a high-speed memory, some or all of which can serve as a cache to a primary, slower memory. The capacity of high-speed memory available to serve as the cache becomes the physical capacity of the cache. The hybrid drive may be configured to virtually extend the physical capacity of the cache by tracking some data stored in the primary memory. In one example, a high-speed, solid state memory (cache memory) may have 8 GBs of physical capacity in a hybrid drive. A data structure such as a cache mapping table may be used to track an additional 8 GBs of data stored in the lower-speed, magnetic memory (primary memory), such that the tracked data may be considered as a virtual extension of the physical capacity of the cache. The tracked data may include data previously evicted from the high-speed memory (e.g., solid state memory) due to higher priority data taking precedence, or a change to the solid state memory capacity due to a change in system condition (e.g., accommodating resume data from the host).

This priority information for data can be determined in a number of different ways, such as a combination of one or more of the following: priority provided by a host system (e.g., as part of write data command), frequency of access of data, duration since last access of data, frequency of reading versus writing data (e.g., read to write ratio), relative importance of data within a priority level, whether data has been synchronized with other storage, and the like. For example, frequently accessed data may be assigned higher priority, as keeping frequently accessed data in the cache could improve performance of a data storage device. As another example, data that has been accessed more recently than other data may be assigned higher priority, as more recently accessed data may likely be accessed again in the future. As yet another example, data that is more frequently read than written may be assigned higher priority, as keeping such frequently read data in the cache could improve performance while reducing non-volatile solid state memory wear. In some embodiments, priority may be assigned based on a weighted combination of one or more of the above factors.

For the sake of simplicity and illustration, the descriptions below are focused on example embodiments where a solid state non-volatile memory serves as cache memory to a primary memory such as a magnetic storage memory. The scope of the disclosure, however, is not limited to such embodiments. For example, in other embodiments, in lieu of magnetic storage memory, a data storage device may include another type of data storage. In place of or in addition to solid state non-volatile memory, a different type of memory, for example any memory that offers faster read or write performance than a different type of memory used in the storage system or device may be used. In still other embodiments, the non-volatile memory that serves as a cache to a primary memory may be located in a remote location from the primary memory, and synchronization of data may take place over one or more network connections.

System Overview

Figure 1:
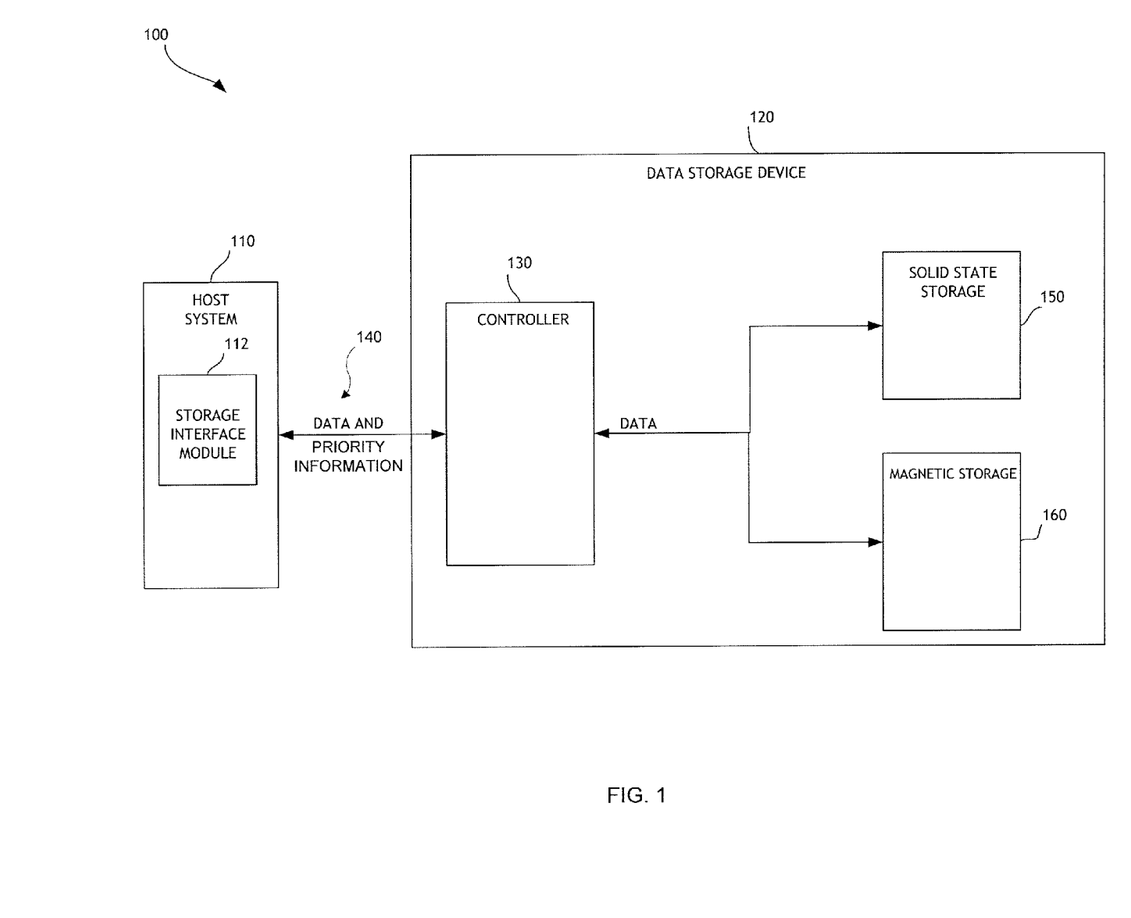
FIG. 1 illustrates a block diagram of a combination of a host system and a data storage device that implements virtual cache capacity extension according to one embodiment of the invention.

Turning first to FIG. 1, a block diagram of a combination 100 of a host system 110 and a data storage device 120 that implements a virtual extended cache is shown. As illustrated, the data storage device 120 (e.g., a hybrid disk drive) includes a controller 130, a solid state storage 150, and magnetic storage 160. In one embodiment, the solid state storage 150 may comprise flash storage, and/or the magnetic storage may comprise magnetic media. The data storage device 120 may include various non-volatile memory, in addition to or in replacement of the solid state storage 150 and/or the magnetic storage 160, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The solid state storage 150 can comprise one or more memory regions, such as blocks, pages, etc. In one embodiment, the solid state storage 150 can act as a cache for the magnetic storage 160. The data storage device 120 can further comprise other types of storage.

The controller 130 of the data storage device 120 can be configured to receive data and/or priority information associated with the data from a storage interface module 112 of the host system 110. The data and/or priority information may be transmitted between the storage interface module 112 and the controller 130 in the form of commands 140 (e.g., storage or access commands) that associate the priority information to the appropriate data to be stored or accessed in the data storage device 120. The controller 130 can also be configured to transmit commands 140 to the storage interface module 112. The commands 140 communicated by the storage interface module 112 can include write data and read data commands issued by the host system 110 along with the associated priority information, for example as metadata to the write data and/or read data commands. Read and write commands can specify a logical address (e.g., logical block addresses or "LBAs") used to access information on the data storage device 120. The controller 130 can execute the received commands 140 in the solid state storage 150 and/or the magnetic storage 160.

The data storage device 120 can store data communicated by the host system 110. In other words, the data storage device 120 can act as memory storage for the host system 110. To facilitate this function, the controller 130 can implement a logical interface. The logical interface can present to the host system 110 the solid state storage 150 and/or the magnetic storage 160 of the data storage device 120 as a set of logical addresses (e.g., contiguous addresses) where data of the host system 110 can be stored. Internally, the controller 130 can map logical addresses to various physical locations or addresses in the solid state storage 150, the magnetic storage 160, and/or other storage modules. Physical locations can be configured to store data. As discussed in greater detail herein, the controller 130 may determine where to store data in the solid state storage 150 and/or the magnetic storage 160 based upon the priority information associated with such data. For example, an extended virtual storage capacity may be configured for the solid state storage 150 that utilizes all or a portion of the magnetic storage 160, as discussed in greater detail below.

Virtual Extended Memory Capacity

Figure 2:
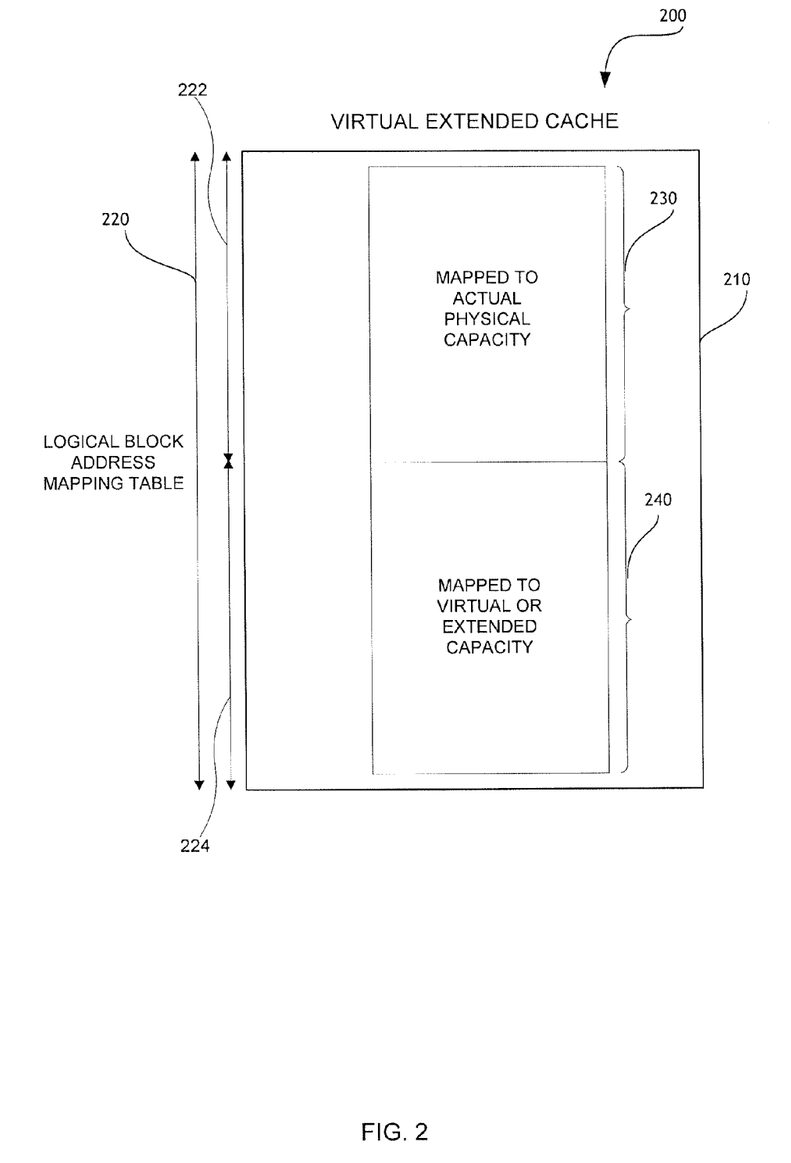
FIG. 2 illustrates a block diagram of a virtual extended cache and mapping table according to one embodiment of the invention.

Turning next to FIG. 2, a block diagram 200 showing a virtual extended cache 210 is illustrated that demonstrates the configuration or use of an extended memory capacity. The virtual extended cache 210 may include features that are the same as or similar to those previously discussed. In one embodiment, the virtual extended cache 210 may correspond to one or more types of non-volatile memory, such as a solid state memory (e.g., NAND flash memory) or other cache memory that is configured to serve as a cache to a primary memory, such as in a hybrid drive. The virtual extended cache 210 has a plurality of mapped capacities such that the virtual extended cache 210 is capable of mapping data at memory locations that extend beyond its actual, physical memory capacity.

As is illustrated, data may be mapped to actual physical capacity 230 of the virtual extended cache 210. For example, data may be mapped to actual physical capacity 230 that corresponds to a physical capacity of solid state memory, such as NAND flash memory, that is physically contained or connected as part of a data storage device. The virtual extended cache 210 also allows for data to be mapped to virtual or extended capacity 240. For example, data may be mapped to virtual or extended capacity 240 that corresponds to another non-volatile memory (e.g., magnetic memory) that is contained or connected as part of the data storage device. In some embodiments, this other non-volatile memory may be a portion of the primary memory. Thus, data desired to be stored in the virtual extended cache 210 may be selectably mapped to actual physical capacity 230 or mapped to virtual or extended capacity 240, as discussed in greater detail herein.

A logical block address mapping table 220 is associated with the memory locations corresponding to actual physical capacity 230 and virtual or extended capacity 240 memory locations of the virtual extended cache 210. The logical block addresses mapping table 220 maintains a first set or span of logical block addresses ("LBAs") 222 corresponding to an amount of data that is within the actual, physical capacity of the virtual extended cache 210 (e.g., an available capacity of the solid state memory). In addition, as shown, a second set or span of LBAs 224 is associated with data not stored within the actual, physical capacity of the virtual extended cache 210 (e.g., not within an available capacity of the solid state memory). Such data may be stored in the primary memory such as the magnetic storage. The data may be stored in locations typical to the conventional mapping scheme within the magnetic storage, or alternatively, stored in dedicated locations within the magnetic storage. Thus, data can be stored or accessed in either in the available capacity of a higher speed cache memory or in a lower-speed primary memory.

Figure 3A:
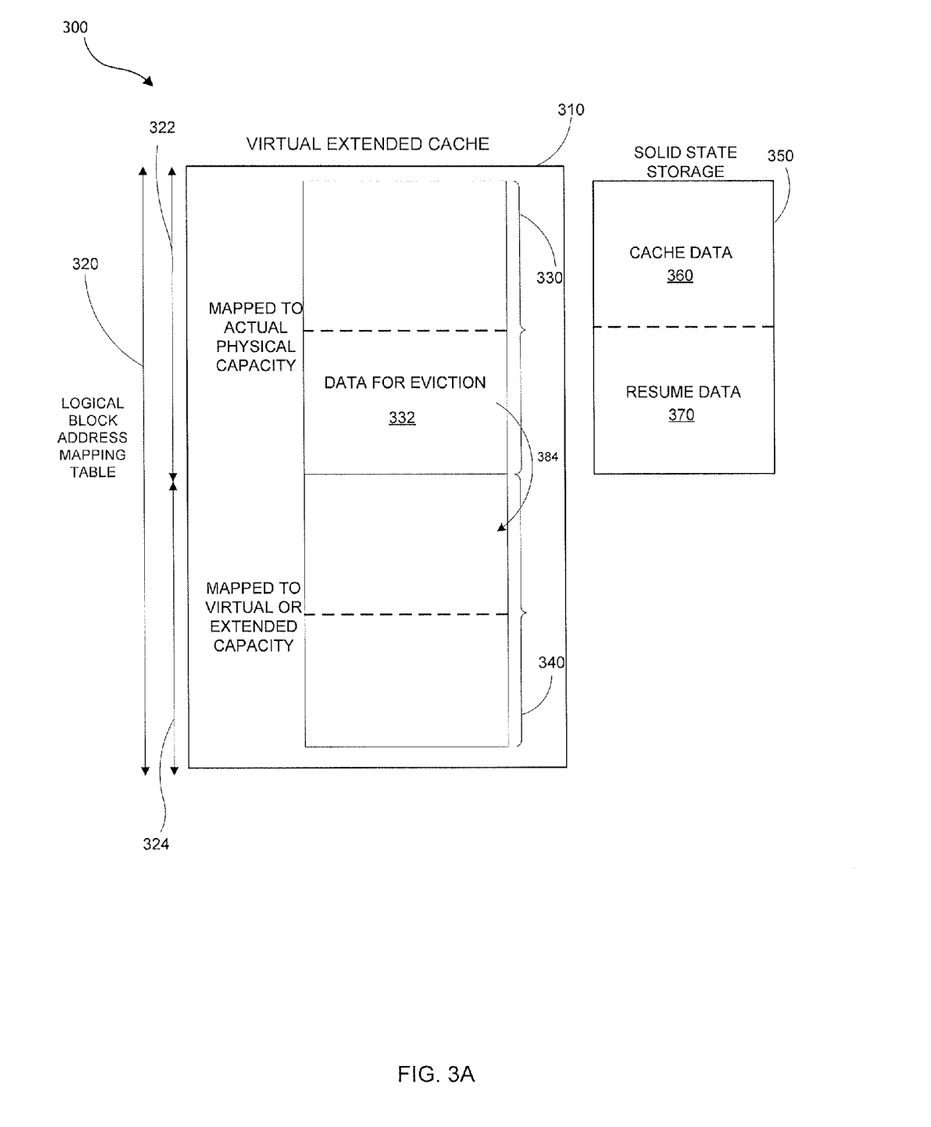
FIG. 3A illustrates a block diagram of a virtual extended cache and mapping table during entry of a hibernate mode by a connected host system according to one embodiment of the invention.

Turning next to FIG. 3A, a block diagram 300 is shown of a virtual extended cache 310 during an operation or process of storing resume data into a physical memory capacity of the virtual extended cache 310. The virtual extended cache 310 may include features that are the same as or similar to those previously discussed. A logical block address mapping table 320 is associated with the memory locations corresponding actual physical capacity 330 and virtual or extended capacity 340 memory locations of the virtual extended cache 310. As illustrated, the virtual extended cache 310 has a plurality of mapped capacities such that the virtual extended cache 310 is capable of mapping data at memory locations that extend beyond its actual, physical capacity. As illustrated, the mapping to actual physical capacity 330 corresponds to an available capacity of solid state storage 350 (e.g., flash memory, such as NAND flash). The mapping to virtual or extended capacity 340 may correspond to other, lower-speed memory (e.g., magnetic memory).

The solid state storage 350 may be used for a variety of data storage purposes, such as caching of more frequently used data, more recently used data, etc. The solid state storage 350 may also be utilized for the storage of resume data 370 for a connected host system. For example, a host computer system may be configured to enter a hibernate mode during a period or time of low or infrequent use. The host computer system may preserve a current state of the host computer system (e.g., by creating or using resume data 370) in non-volatile memory before reducing power to the system. Subsequently, upon restoration of power, the resume data 370 may be accessed in order to restore the host computer system to the preserved state. Solid state non-volatile memory, such as the solid state storage 350, allows for a quick restoration of the computer system to the preserved state due to the high read transfer rate of the resume data 370.

Instead of segregating off a portion of solid state storage for use exclusively for resume data, the embodiment shown in FIG. 3A illustrates an embodiment that allows resume data to be stored and/or accessed in the solid state storage 350 without permanently interfering with other cache data that may desirably be stored in the solid state storage 350. Thus, in a preferred embodiment, the traditional waste of expensive solid state storage locations during times when resume data is not used can be avoided.

For example and as illustrated, upon a host computer system entering a hibernate process, resume data 370 may be generated by the host computer system for preserving a state of the host computer system. For improved performance, the resume data 370 may be desirably stored in the solid state storage 350. However, prior to storage of the resume data 370 in the solid state storage 350, other data for eviction 332 that was previously mapped to actual physical capacity 330 (e.g., stored in the solid state storage 350 alongside other cache data 360) must be removed or transferred 384 and mapped to virtual or extended capacity 340. The eviction may, for example, involve (1) removing the data from the solid state storage when an identical copy is already stored in the magnetic media, or (2) transferring the data from the solid state storage to the magnetic media, which may overwrite an obsolete copy on the magnetic media. In either case, the data will reside in the primary storage (e.g., magnetic storage) after the eviction and the mapping table is updated to reflect the change in physical storage location (noting that the particular LBAs are now on the magnetic storage, for example) and new designation of the data as being within the virtual or extended capacity 340.

In one embodiment, upon the host computer system beginning the hibernate process, the priority of the resume data 370 is determined (e.g., by the host system and/or by the data storage device or device incorporating the virtual extended cache 310) to be of a higher priority than that of the data for eviction 332, triggering the eviction of data 332. Any of a variety of logical evaluations or steps may be used for determining the relative priority of the resume data 370 when compared to the priority of the data for eviction 332. In one embodiment, upon the start of hibernation, no priority comparison is made as the resume data is atomically accepted into the solid state memory, reducing its available capacity to be used as the physical capacity of the cache and thus potentially triggering the need to evict data.

After the data for eviction 332 has been removed or transferred 384 and mapped to virtual or extended capacity 340, storage space is freed up or made available in the solid state storage 350 in order to accommodate the resume data 370. The resume data 370 may not use up all the space of the solid state storage 350, such that the other cache data 360 exists along with the resume data 370 in the solid state storage 350.

Figure 3B:
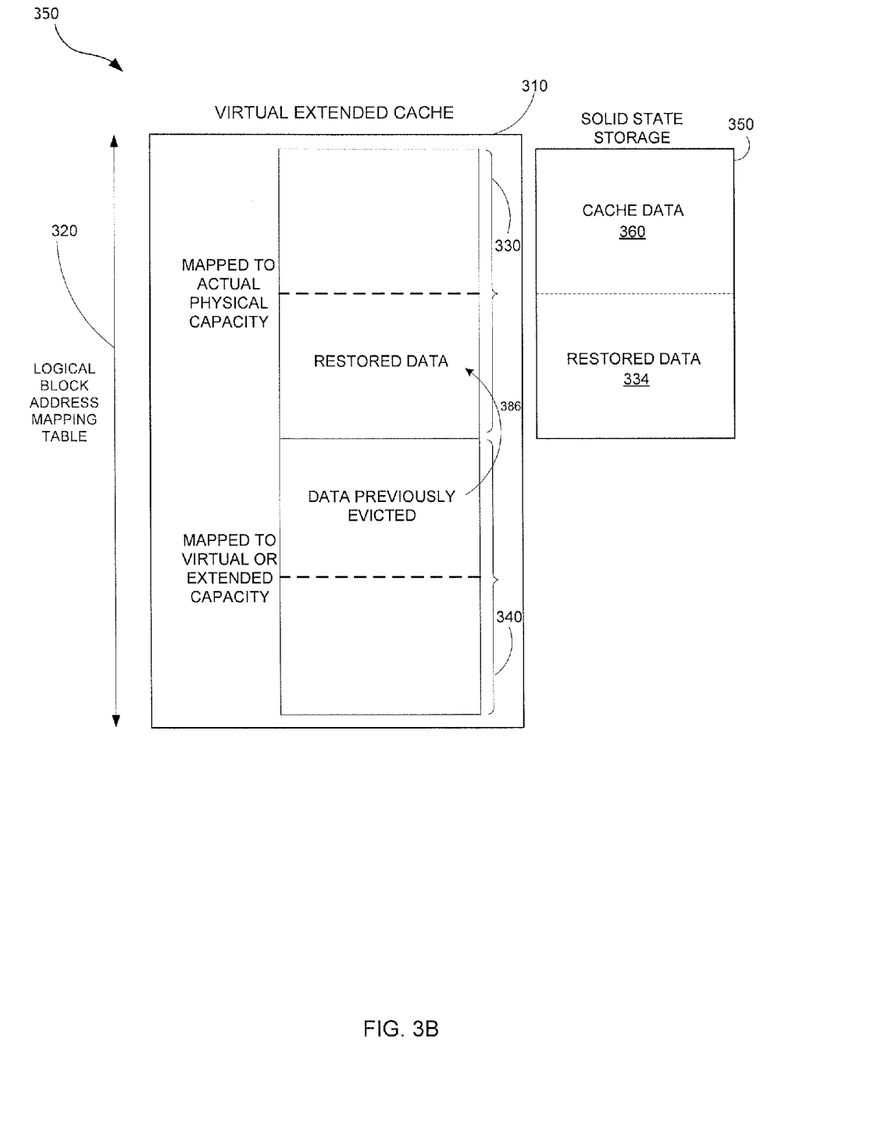
FIG. 3B illustrates a block diagram of the virtual extended cache and mapping table of FIG. 3A during exit from the hibernate mode by the connected host system according to one embodiment of the invention.

Turning next to FIG. 3B, a block diagram 350 is shown of the virtual extended cache 310 discussed in FIG. 3A, but during an operation or process of restoring data into a physical memory capacity of the virtual extended cache 310 after the host computer system exits from the hibernate mode. Upon beginning a process to exit from the hibernate mode, the resume data 370 (see FIG. 3A) is accessed and used to restore the state of the host computer system. After such use, the resume data 370 is no longer needed and can thus be removed from the solid state memory 350. As a result, the available capacity for caching is increased. At this time, the data previously evicted (the data for eviction 332 of FIG. 3A) is restored or transferred 386 and mapped to actual physical capacity 330 once again, becoming restored data 334 again residing in the solid state storage 350. The restoring or transferring 386 of data may happen automatically (e.g., without further commands or signals from an external device or host machine) when the host computer system exits from the hibernate or sleep mode. By tracking evicted data 332 in the virtual extended cache, upon resume the data storage device can quickly fill the expanded physical capacity of the cache. In a conventional data storage device where evicted data is not tracked, the newly increased capacity is typically filled over time until the caching algorithm learns anew what data should be placed here. By contrast, in certain embodiments of the invention, by utilizing the virtual extended caching scheme described above, a full cache of data can thus be immediately reconstructed upon resume, offering an improved data access performance.

Figure 4:
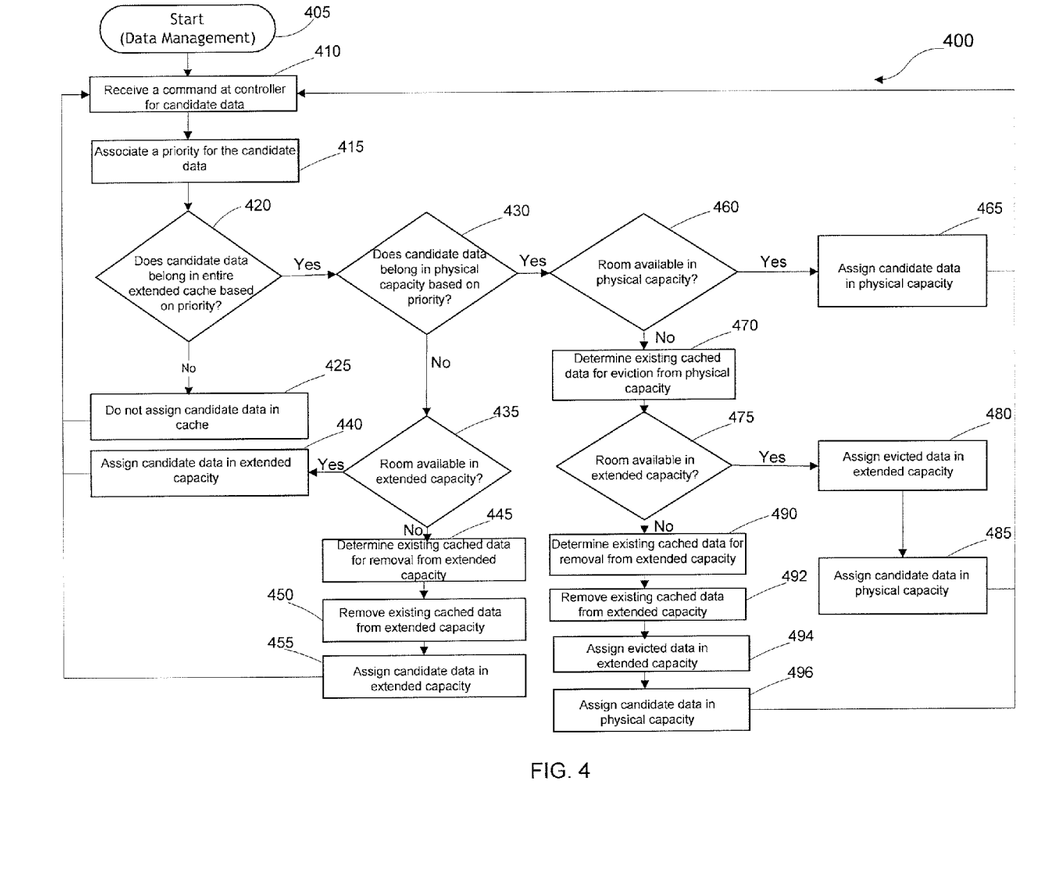
FIG. 4 illustrates a flowchart for data storage operation of a virtual extended cache using priority information according to one embodiment of the invention.

FIG. 4 shows an exemplary flowchart 400 for operation of a virtual extended cache and mapping system using priority information for data to be assigned in the virtual extended cache. In one embodiment, data may be assigned in the cache by modifying a mapping table, but without physically moving the data between different memory locations. The virtual extended cache may include features that are the same as or similar to those previously discussed. At block 405, data management operation begins. This may occur upon providing power to a data storage device including the virtual extended cache, providing power to a host system that is connected to the data storage device, initializing the data storage device and/or the host system, or otherwise beginning any process where data is requested to be read or written in the virtual extended cache. At block 410, a controller for the data storage device receives a command (e.g., a host data command from the host system or an internal data command, such as a specialized command or command relating to background activity for the data storage device that is generated by the data storage device itself) indicating that data is desired to be read or written in the data storage device. This command may be an electrical signal received via wired or other conductive connections or via a wireless transmission.

At block 415, a priority is determined for data associated with the command received at block 410. This priority may be priority information that corresponds to candidate data that is desired to be assigned in the cache memory. The priority information may be determined solely by the data storage device. In another embodiment, the priority information may be received by the controller (e.g., the priority information may be transmitted by the host system). At block 420, the data storage device determines whether the candidate data belongs in the entire virtual extended cache (either in the physical capacity or the virtual capacity) based upon the associated priority. For example, if the priority associated with the candidate data of the command received at block 410 is lower than the priorities of all other data that already exists in the virtual extended cache, the data storage device may determine that the candidate data should not be assigned in the virtual extended cache.

If the candidate data does not belong in the virtual extended cache, operation continues to block 425, where the candidate data is not assigned in the virtual extended cache. In a hybrid drive example, the candidate data may simply be written or accessed via the magnetic media without adding any tracking metadata in a cache mapping table indicating that it is cached data. Next, the operation proceeds back to block 410 where a new command is received at the controller and the process begins again. However, if the data storage device determines that the candidate data does belong in the virtual extended cache, such as when the priority associated with the data at block 410 is higher than at least one priority corresponding to data that already exists in the virtual extended cache, operation continues to block 430.

At block 430, the data storage device determines whether the candidate data to be assigned in the virtual extended cache belongs in a physical capacity of the virtual extended cache based upon the associated priority. Similar to the discussion above, if the priority associated with the data at block 410 is lower than priorities of all other data that already exists in the physical capacity of the virtual extended cache, the data storage device may determine that the candidate data should not be assigned in the physical capacity and operation continues to block 435. If the priority associated with the data at block 410 is higher than at least one priority corresponding to data that already exists in the physical capacity of the virtual extended cache, the data storage device may determine that the candidate data should be assigned in the physical capacity and operation proceeds to block 460.

At block 435, the data storage device determines if there is any room or capacity available in the extended capacity of the virtual extended cache for the candidate data. For example, if the extended capacity of the virtual extended cache is 8 Gigabytes (GBs), determined by the amount of data that is desired to be tracked, and if 7.8 GBs of that memory are currently being used by existing data, but the candidate data would take up greater than 0.2 GBs of that memory, then there is not enough room or capacity in the extended capacity of the virtual extended cache for the candidate data. In one embodiment, the capacity of the virtual extended cache may correspond to a maximum number of LBA entries in a cache mapping table such as that shown previously in FIGS. 3A and 3B. If room does exist, then operation continues to block 440 and the candidate data is assigned in the extended capacity of the virtual extended cache at an available memory location and no existing data needs to be displaced from the extended capacity. As previously noted above, in one embodiment storing data in the extended capacity involves storing the data on the magnetic media and updating the mapping table to track the data (e.g., LBA) as being part of the extended virtual cache. Operation then continues back to block 410 where a new command is received at the controller and the process begins again.

If room does not exist, operation instead proceeds to block 445 and the data storage device determines what existing cached data in the extended capacity of the virtual extended cache should be removed from the virtual extended cache. This determination may be based upon a comparison of the priority information associated with the candidate data and with one or more priority information associated with existing cached data in the extended capacity. For example, if the cached data has a higher priority than the priority of one or more existing cached data, then that existing cached data may be determined to be removed from the virtual extended cache. At block 450, the existing cached data determined to be removed in block 445 is removed from the extended capacity. In one embodiment, the mapping table is updated to no longer track the data, effectively removing the data as being part of the cache. And then at block 455 the candidate data is assigned in the extended capacity (e.g., the candidate data is written to magnetic storage and the mapping table is updated to track the candidate data as being part of the cache). Operation then continues back to block 410 where a new command is received at the controller and the process begins again.

Returning to block 430, if it is determined that the candidate data does belong in the physical capacity of the virtual extended cache based on the associated priority, at block 460, the data storage device determines if there is any room or capacity available in the actual, physical capacity of the virtual extended cache for the candidate data. Similar to the discussion above for block 435, in one example, if the physical capacity of the virtual extended cache includes 8 Gigabytes (GBs) of solid state memory and if 7.8 GBs of that memory are currently being used by existing data, but the candidate data would take up greater than 0.2 GBs of that memory, then there is not enough room in the physical capacity of the virtual extended cache for the candidate data. If room does exist, then operation continues to block 465 and the candidate data is assigned in the physical capacity of the virtual extended cache at an available memory location (e.g., in the solid state storage) and no existing data needs to be displaced from the physical capacity. Operation then continues back to block 410 where a new command is received at the controller and the process begins again.

However, if room does not exist, operation instead proceeds to block 470 and the data storage device determines what existing cached data in the physical capacity of the virtual extended cache should be evicted from the physical capacity of the virtual extended cache. This determination may be based upon a comparison of the priority information associated with the candidate data with one or more priority information associated with existing cached data in the physical capacity. For example, if the candidate data has a higher priority than the priority of one or more existing cached data, then that existing cached data may be determined to be evicted.

After determining the existing cached data for eviction at block 470, operation continues to block 475 and, similar to the discussion above for block 435, the data storage device determines if there is any room or capacity available in the extended capacity of the virtual extended cache for the evicted data of block 470. For example, if the extended capacity of the virtual extended cache includes 8 Gigabytes (GBs) and if 7.8 GBs of that memory are currently being used by existing data, but the evicted data would take up greater than 0.2 GBs of that memory, then there is not enough room in the extended capacity of the virtual extended cache for the evicted data. If room does exist, then operation continues to block 480 and the evicted data is assigned in the extended capacity of the virtual extended cache at an available memory location and no existing data needs to be displaced from the extended capacity. At block 485, the candidate data to be assigned in the physical capacity (determined at block 430) is then assigned in the physical capacity of the virtual extended cache at an available memory location (e.g., in the solid state storage), for example at the memory location freed up by evicting the evicted data into the extended capacity. Operation then continues back to block 410 where a new command is received at the controller and the process begins again.

If room does not exist in the extended capacity for the evicted data of block 470, as determined in block 475, operation instead proceeds to block 490 and the data storage device determines what existing cached data in the extended capacity of the virtual extended cache should be removed from the virtual extended cache. This determination may be based upon a comparison of the priority information associated with the evicted data and with one or more priority information associated with existing cached data in the extended capacity. For example, if the evicted data has a higher priority than the priority of one or more existing cached data, then that existing cached data may be determined to be removed. At block 492, the existing cached data determined to be removed in block 490 is removed from the extended capacity (following a process similar to that previously described at block 455) and at block 494, the evicted data of block 470 is assigned in the extended capacity, for example at the memory location freed up by the elimination of the existing cached data per block 492. The candidate data to be assigned in the physical capacity (per block 430) is then assigned in the physical capacity of the virtual extended cache at an available memory location (e.g., in the solid state storage), for example at the memory location freed up by the removal of the evicted data into the extended capacity. Operation then continues back to block 410 where a new command is received at the controller and the process begins again.

Figure 5:
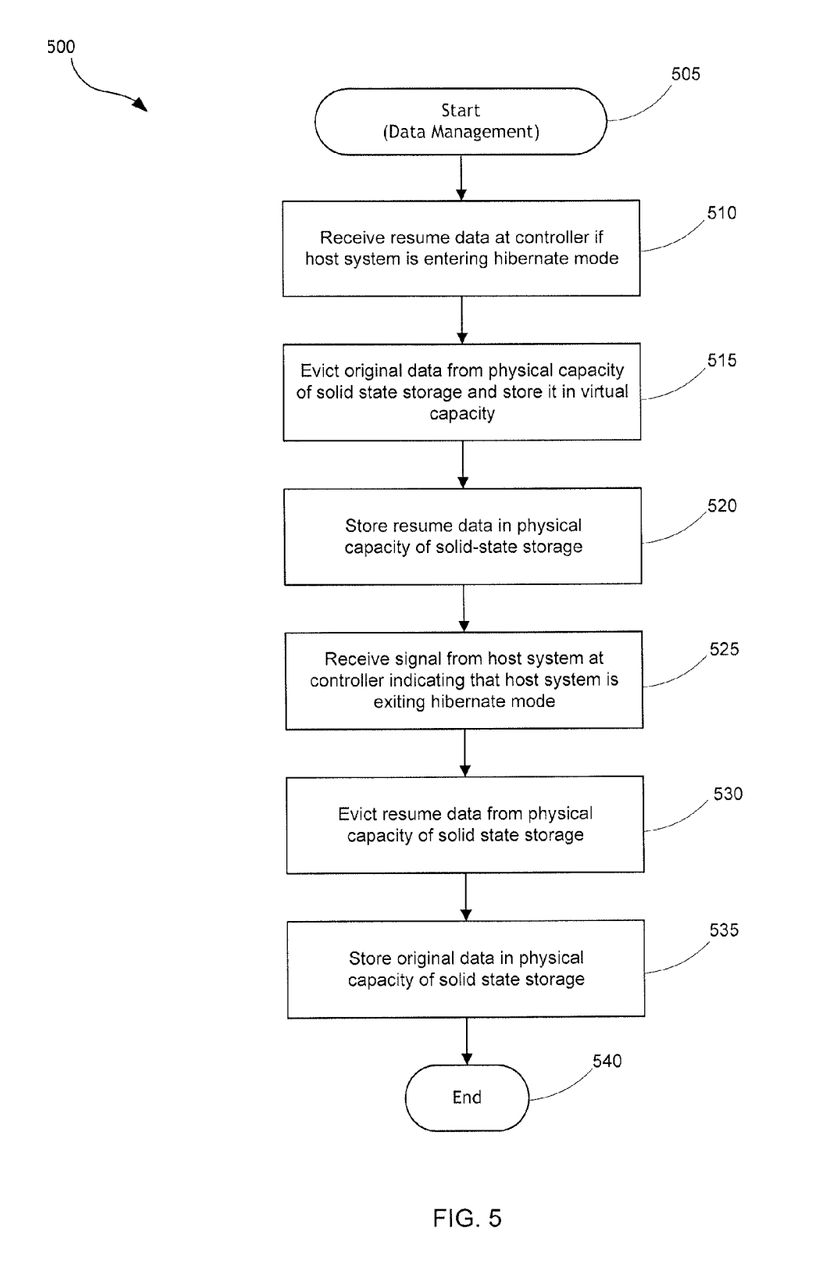
FIG. 5 illustrates a flowchart for operation of a virtual extended cache that is configured to interface with a host system capable of entering into and out of a hibernate mode according to one embodiment of the invention.

FIG. 5 illustrates a flowchart 500 for operation of a virtual extended cache and mapping system configured to interface with a host system entering into and out of a hibernate mode according to one embodiment of the invention. The virtual extended cache and mapping system may include features that are the same as or similar to those previously discussed, and include a physical capacity of solid state storage and a virtual capacity of storage. At block 505, data management operation begins. This may occur upon providing power to a data storage device including the virtual extended cache, providing power to a host system that is connected to the data storage device, initializing the data storage device and/or the host system, or otherwise beginning any hibernation process for the host system. At block 510, a controller for the data storage device receives resume data from the host system upon the host system entering a hibernate mode.

At block 515, some or all original or existing data in the physical capacity of the solid state storage is evicted from the physical capacity of the solid state storage, which may involve removal of the data and transfer of the data to a primary storage such as magnetic storage. In one embodiment, the evicted data is stored in a virtual capacity of the cache memory by virtue of storing some mapping information to indicate that the data belongs to the virtual extended cache. At block 520, the resume data received from the host system in block 510 is stored in the physical capacity of the solid state storage, for example at a memory location made available due to the eviction of the original or existing data in block 515. The host system may then be powered down or otherwise enter a sleep or hibernation mode with its previous state preserved via the resume data saved in the physical capacity of the solid state storage.

At block 525, upon the host system exiting from the sleep or hibernation mode, the controller for the data storage device receives a signal from the host system indicating that the host system is exiting from the hibernate or sleep mode. At block 530, after use of the resume data in the physical capacity of the solid state storage to return the host system to its preserved state, the resume data is evicted from the physical capacity of the solid state storage. At block 535, the original data that was evicted from the physical capacity of the solid state storage (see block 515) is stored in the physical capacity of the solid state storage again. Due to the tracking of such original data in the virtual extended cache, the storage of the original data in block 535 may happen automatically without any further signals or commands from the host system indicating that the original data is to be returned to the physical capacity of the solid state storage. At block 540, the process ends, for example, until the host system again begins the process to enter a hibernate state, at which time the process of FIG. 5 will begin anew.

Conclusion

The disclosed data storage devices and processes utilize a virtual memory capacity that extends beyond the actual, physical memory capacity of a given memory, such as a solid state memory. Priority information, either provided from a connected, external device, such as a host system, or determined internally by a data storage device is used to determine memory locations for the storage, transfer, or removal of data that is stored as part of the data storage device. This can, for example, allow the data storage device to efficiently manage data stored within to improve access speed of prioritized data. For example, speedy hibernate and resume functionality of a host system can be accommodated without the data storage device providing additional solid state memory to only be used in such circumstances.

Other Variations

Those skilled in the art will appreciate that in some embodiments, disclosed techniques can applied to other data management operations performed by a storage system. For example, priority of data can be taken into account during wear leveling, bad block management, and so on. In addition, additional or alternative factors can be used to determine priority of stored data or in conjunction with the use of such priority to determine management of data storage locations. Priority of stored data can be determined using any suitable combination of factors and applying any suitable function to the combination, such as averaging, weighted averaging, least squares determination, and other linear and/or nonlinear functions. The actual steps taken in the disclosed processes, such as the processes illustrated in FIGS. 4 and 5, may differ from those shown in the figures. Also, in some embodiments, instead of a solid state memory, the higher speed memory may be a portion of the magnetic media (e.g., a cache memory area on the outer diameter of the magnetic disks, where data rate is higher). Additional system components can be utilized, and disclosed system components can be combined or omitted. Depending on the embodiment, certain of the steps explicitly described above may be removed, others may be added, and/or the steps may be re-arranged in order. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, solid state drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. In a data storage device having a cache memory configured to serve as a cache to a primary memory, a method of managing data in the cache memory, the method comprising:
    maintaining a first set of logical block addresses (LBAs) associated with data stored in the cache memory, the first set of LBAs corresponding to an amount of data that is within an available capacity of the cache memory;
    maintaining a second set of LBAs associated with data not stored within the available capacity of the cache memory;
    evicting, from the available capacity of the cache memory, first data associated with an LBA within the first set LBAs, the first data selected for eviction based at least in part on first priority information associated with the first data; and
    associating the LBA associated with the evicted first data with the second set of LBAs.

2. The method of claim 1, wherein evicting the first data from the cache memory is triggered based on a condition that changes the available capacity of the cache memory.

3. The method of claim 2, wherein the condition is related to accommodating system data from a host system to be stored in the available capacity of the cache memory.

4. The method of claim 3, wherein the system data comprises resume data for the host system as it enters into a sleep mode.

5. The method of claim 4 further comprising:
    restoring the first data into the available capacity of the cache memory based on the host system resuming from the sleep mode; and
    associating the LBA associated with the first data with the first set of LBAs.

6. The method of claim 1, wherein the first and second sets of LBAs are maintained on a same data structure.

7. The method of claim 1, wherein the first and second sets of LBAs are maintained on different data structures.

8. The method of claim 1 wherein the data storage device is a hybrid drive.

9. The method of claim 1 wherein the available capacity of the cache memory comprises non-volatile solid state memory.

10. The method of claim 1 further comprising comparing the first priority information with second priority information associated with second data associated with an LBA within the second set of LBAs.

11. The method of claim 10 wherein comparing the first priority information with the second priority information includes determining if the second data is more recently used than the first data.

12. The method of claim 10 wherein comparing the first priority information with the second priority information includes determining if the second data is more frequently used than the first data.

13. The method of claim 1 wherein the first priority information is received from a host system.

14. A data storage device, comprising:
    a non-volatile magnetic memory configured to store data therein;
    a non-volatile solid state memory configured to store data therein, the non-volatile solid state memory configured to act as a cache to the non-volatile magnetic memory; and
    a controller interfacing with the non-volatile magnetic memory and the non-volatile solid state memory, the controller configured to:
        maintain a first set of logical block addresses (LBAs) associated with data stored in the non-volatile solid state memory,
        maintain a second set of LBAs associated with data not stored in the non-volatile solid state memory,
        receive priority information for first data associated with an LBA within the first set of LBAs, and
        associate the LBA associated with the first data with the second set of LBAs based at least in part on the priority information.

15. The data storage device of claim 14 wherein the non-volatile solid state memory comprises NAND type flash memory.

16. The data storage device of claim 14 wherein the controller is further configured to:
    re-associate the LBA associated with the first data with the first set of LBAs based at least in part on the priority information.

17. The data storage device of claim 16 wherein the controller is further configured to interface with a host system and wherein the LBA associated with the first data is associated with the second set of LBAs in response to the host system entering a hibernate mode.

18. The data storage device of claim 17 wherein the LBA associated with the first data is re-associated with the first set of LBAs in response to the host system resuming from the hibernate mode.

19. A method of managing data in a hybrid data storage device having a non-volatile magnetic storage, a non-volatile flash storage configured to act as a cache to the non-volatile magnetic storage, and a controller communicating with the non-volatile magnetic storage and the non-volatile flash storage, the method comprising:
   maintaining, by the controller, a data structure including a first set of logical block addresses (LBAs) for data stored in the non-volatile flash storage and a second set of LBAs for data not stored in the non-volatile flash storage;
   receiving first data at the controller;
   associating an LBA with the first data;
   receiving first priority information at the controller, the first priority information corresponding to the first data; and
   associating the LBA associated with the first data with the first set of logical block addresses based on the first priority information.

20. The method of claim 19 wherein the controller is configured to interface with a host system, the host system configured to enter or exit a hibernate mode, the method further comprising:
   evicting the first data from the non-volatile flash storage based on the host system entering the hibernate mode; and
   automatically transferring the evicted first data to the non-volatile flash storage based on the host system exiting the hibernate mode.

* * * * *